(No Model.)

L. HERMAN.
ANIMAL TRAP.

No. 491,309. Patented Feb. 7, 1893.

WITTNESSES:
John R. McGugg
Geo. B. Riley

INVENTOR.
Ludwig Herman

UNITED STATES PATENT OFFICE.

LUDWIG HERMAN, OF CLEVELAND, OHIO.

ANIMAL-TRAP.

SPECIFICATION forming part of Letters Patent No. 491,309, dated February 7, 1893.

Application filed May 21, 1892. Serial No. 433,878. (No model.)

*To all whom it may concern:*

Be it known that I, LUDWIG HERMAN, a citizen of the United States, residing at Cleveland, in the county of Cuyahoga, State of Ohio, have invented a new and useful Animal-Trap, of which the following is a specification.

My invention relates to improvements in traps as used for catching or destroying animals and the object of my invention is to provide a trap of simple construction free from all parts liable to get out of order, or subject to excessive wear thereby producing a trap that will be quick and sure in its action, easy to set and durable. I accomplish this object by the device illustrated in the accompanying drawings in which—

Figure 1:
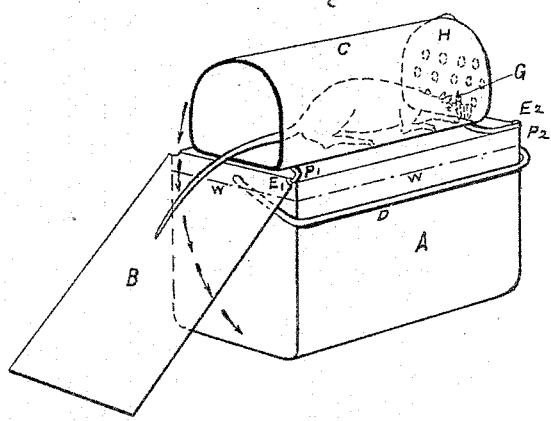
Figure 2:
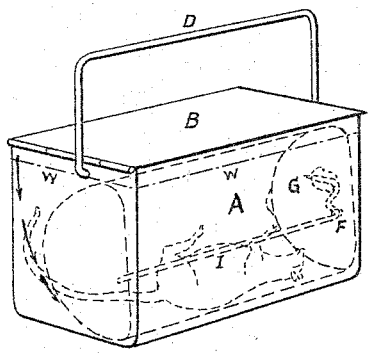
Figure 4:
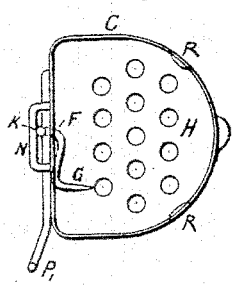
Figure 3:
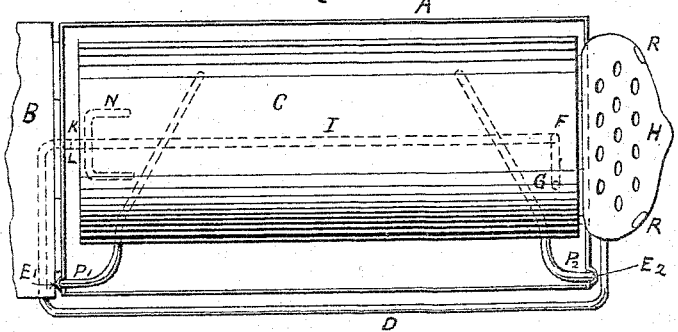
Figure 5:
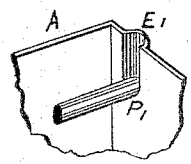

Figure 1. is a perspective view of the trap set and baited, Fig. 2. shows the trap in perspective, closed up ready for carrying the same away after an animal has been caught and drowned. Fig. 3. is a plan view of the trap showing the cover H partly open. Fig. 4. is an end view of the cage, while Fig. 5. is a part of the lower box showing how the cage is pivoted to the same.

Similar letters refer to similar parts in the several views.

In Figs. 1. 2. and 3. A represents a box or tank provided with a cover B. This cover answers for an incline when opened as shown in Fig. 1. to facilitate the access of the animal to the cage C, when the trap is set, and will serve as a cover while the trap is carried from place to place or when not in use.

The tank A may be filled with water up to the dotted line W. W. It is provided with a bail D and has at E′ and E² suitable pockets or slots for the purpose of receiving the pivots on which the cage C is hinged, these are shown more clearly in Fig. 5.

The cage C in Figs. 1, 2, 3 and 4. may be made of wire, sheet metal or any suitable material of such size or shape as to admit the animal intended to be trapped, readily. It is entirely open at one end, while the opposite end is closed by means of a cover H hinged or otherwise attached to the cage. This cover H may also consist of wire, or of sheet metal and so on but would then be perforated so as to admit light air and water freely. It is provided with a catch at R to keep it in place. Near the cover H is a bait hook G of any suitable shape pivoted at F and connected with a latch or lever I in such a way that the slightest motion of the hook G will throw the end K. of the lever I off its support L. The support L may be formed by the end of the bail D passing through the end of the box A or by the end of the hinge pin or cover B.

N is a guide attached to the cage so as to support the bolt I without interfering with its required motion. The cage C is also provided with two pivots P′ I‴, working freely in the pockets or slots E′ E″.

The cover B should be provided with corrugations, cross bars, or their equivalent (not shown in the drawings) so as to assist the animal in running up the incline.

By lifting the pivots P′, P²., out of the pockets or slots E′, E², the cage can be detached from the tank A, the cover H is then opened the bait secured to the hook G, the cover H replaced, the cage C is then put in place again resting on pivots P′, P², and on L by means of the end K of the lever I all as shown in the drawings.

Attracted by the bait the animal will after ascending the incline B enter the cage and by nibbling on the bait move the lever I off its support L, the cage will then swing around its pivots P′. P². downward in the direction indicated by the arrows, under its own weight, assisted by the weight of the animal. Should the weight of the cage itself, be insufficient for quick action, it could readily be increased by means of an extra piece of metal secured to the cage. The cage C will in this way come to the position within the box A shown in Fig. 2. The open end of the cage, when the trap is set, is entirely unobstructed, by any apparatus that may arouse the suspicion of the animal to be caught. The cage released from its support at L, when the animal only touches the bait, will quickly descend, submerging the vermin, and holding it confined, thereby drowning it. Should it be desired to capture the animal alive the water must be omitted.

If the box A should be put into a suitable hole in the floor, bringing the cage to a level therewith, the trap would be still more accessible and effective. Some vermin is attracted by live bait only. In such a case I would place the bait into any suitable box, cut a hole in one of its sides, to correspond with the cover H, detach H from the cage, and close said hole with it, then place the trap close to the box so that the rear end of the cage C would be in close proximity to H. The vermin, in trying to get through H at the live bait, would move the lever I and so operate the trap as in the other case.

The cage C may be made of glass either entirely or only the upper part thereof, making the floor, whereon the different attachments are fastened out of sheet or cast metal. This would expose the bait to the view of the animal to be trapped, and may be very effective, for instance in trapping birds.

Having fully described my invention, what I desire to claim and secure by Letters Patent is:

1. In an animal trap, the combination of a swinging cage or compartment pivotally hung in the upper portion of a suitable box, a bait hook located at the inner and closed end of said cage, a lever or rod, one end of which is connected to said bait hook, the opposite end being adapted to engage with a detent projecting inwardly from said box, the parts being so constructed and arranged that, as the lever is released from the detent through the action of the bait hook, the said cage will swing downwardly into the said box, substantially in the manner and for the purpose described.

2. In an animal trap, the combination of a box, a swinging cage located and pivotally hinged at its extremities in the upper portion of said box, an adjustable door at one end of said cage, and the means described for retaining said cage in its horizontal or "set" position, substantially as set forth.

LUDWIG HERMAN.

Witnesses:
J. R. McQUIGG,
GEO. B. RILEY.